United States Patent
Edwards et al.

(10) Patent No.: US 10,162,502 B2
(45) Date of Patent: *Dec. 25, 2018

(54) PINNING A CALLOUT ANIMATION

(71) Applicant: Microsoft Technology Licensing, LLC, Redmond, WA (US)

(72) Inventors: Christopher D. Edwards, Seattle, WA (US); Jaclyn E. Konzelmann, Seattle, WA (US); Galen M. Elias, Bellevue, WA (US); Terry J. Mahaffey, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/344,143

(22) Filed: Nov. 4, 2016

(65) Prior Publication Data

US 2017/0052686 A1 Feb. 23, 2017

Related U.S. Application Data

(63) Continuation of application No. 14/694,661, filed on Apr. 23, 2015, now Pat. No. 9,489,761, which is a
(Continued)

(51) Int. Cl.
*G06F 3/0484* (2013.01)
*G06F 3/0482* (2013.01)
(Continued)

(52) U.S. Cl.
CPC ........ *G06F 3/04845* (2013.01); *G06F 3/0482* (2013.01); *G06F 3/04842* (2013.01);
(Continued)

(58) Field of Classification Search
CPC .. G06F 3/048–3/04897; G06T 2200/24; G06T 13/80
See application file for complete search history.

(56) References Cited

U.S. PATENT DOCUMENTS 5,559,942 A 9/1996 Gough et al.
6,072,486 A 6/2000 Sheldon et al.
(Continued)

OTHER PUBLICATIONS

Start Menu, Taskbar, Quick Launch, Sidebar, Desktop, retrieved Aug. 11, 2011, http://www.optimizingpe.com/vista/startmenu_quicklaunch_desktop_sidebar.html, 8 pages.
(Continued)

*Primary Examiner* — Daniel F Hajnik
(74) *Attorney, Agent, or Firm* — Merchant & Gould

(57) ABSTRACT

Animation for the attachment of content items to a location on a content surface in a user interface is provided. A user interface showing a content surface may be displayed on a computer. The content surface may include a content item at an initial position above the content surface. The content surface may display content formatted for display over an area comprising a totality of the content surface. The computer may then receive in the user interface a request to attach the content item to a final position on the content surface. The computer may then display an animation of the content item moving, from the initial position, across the content surface until the final position has been reached. The computer may then attach the content item to the content surface at the final position.

20 Claims, 15 Drawing Sheets

Related U.S. Application Data continuation of application No. 13/274,828, filed on Oct. 17, 2011.

(51) Int. Cl.
| | | |
|---|---|---|
| *G06F 17/24* | (2006.01) | |
| *G06T 13/80* | (2011.01) | |
| *G06T 13/00* | (2011.01) | |
| *G06F 3/0481* | (2013.01) | |

(52) U.S. Cl.
CPC .......... *G06F 3/04847* (2013.01); *G06F 17/24* (2013.01); *G06T 13/00* (2013.01); *G06T 13/80* (2013.01); *G06F 3/04817* (2013.01); *G06T 2200/24* (2013.01)

(56) References Cited

U.S. PATENT DOCUMENTS

| | | | |
|---|---|---|---|
| 6,133,925 | A | 10/2000 | Jaremko et al. |
| 6,215,490 | B1 | 4/2001 | Kaply |
| 6,710,788 | B1 | 3/2004 | Freach et al. |
| 7,434,177 | B1 | 10/2008 | Ording et al. |
| 8,564,544 | B2 | 10/2013 | Jobs et al. |
| 9,489,761 | B2 | 11/2016 | Edwards et al. |
| 2004/0204988 | A1 | 10/2004 | Willers |
| 2005/0028094 | A1 | 2/2005 | Allyn |
| 2005/0289478 | A1 | 12/2005 | Landman et al. |
| 2006/0168538 | A1 | 7/2006 | Stevens et al. |
| 2007/0074126 | A1 | 3/2007 | Fisher et al. |
| 2008/0201196 | A1 | 8/2008 | Rowland |
| 2009/0094523 | A1 | 4/2009 | Treder et al. |
| 2009/0177981 | A1 | 7/2009 | Christie et al. |
| 2009/0228824 | A1 | 9/2009 | Forstall et al. |
| 2010/0017872 | A1 | 1/2010 | Goertz et al. |
| 2010/0229122 | A1 | 9/2010 | McCormack et al. |
| 2010/0302278 | A1 | 12/2010 | Shaffer et al. |
| 2011/0072394 | A1 | 3/2011 | Victor |
| 2011/0087984 | A1* | 4/2011 | Jitkoff .................. G06F 3/0486 715/769 |
| 2011/0119609 | A1* | 5/2011 | Bhatt .................. G06F 3/0481 715/765 |
| 2011/0167369 | A1 | 7/2011 | Van Os |
| 2011/0179350 | A1 | 7/2011 | Capela et al. |
| 2012/0054674 | A1 | 3/2012 | Beykpour et al. |
| 2013/0093793 | A1 | 4/2013 | Edwards |
| 2014/0282206 | A1 | 9/2014 | Moore et al. |

OTHER PUBLICATIONS

U.S. Appl. No. 13/274,828, Amendment and Response filed May 24, 2013, 16 pages.
U.S. Appl. No. 13/274,828, Amendment and Response filed Sep. 27, 2013, 17 pages.
U.S. Appl. No. 13/274,828, Amendment and Response filed Mar. 25, 2014, 12 pages.
U.S. Appl. No. 13/274,828, Amendment and Response filed Jun. 24, 2014, 14 pages.
U.S. Appl. No. 13/274,828, Amendment and Response filed Nov. 21, 2014, 13 pages.
U.S. Appl. No. 13/274,828, Notice of Allowance dated Jan. 23, 2015, 11 pages.
U.S. Appl. No. 13/274,828, Notice of Allowance dated Mar. 19, 2015, 4 pages.
U.S. Appl. No. 13/274,828, Office Action dated Jun. 27, 2013, 25 pages.
U.S. Appl. No. 13/274,828, Office Action dated Nov. 29, 2013, 17 pages.
U.S. Appl. No. 13/274,828, Office action dated Apr. 7, 2014, 24 pages.
U.S. Appl. No. 13/274,828, Office Action dated Jul. 23, 2014, 18 pages.
U.S. Appl. No. 13/274,828, Office Action dated Feb. 28, 2013, 23 pages.
U.S. Appl. No. 14/694,661, 1.312 Amendment filed Sep. 9, 2016, 9 pages.
U.S. Appl. No. 14/694,661, Amendment and Response filed Mar. 18, 2016, 23 pages.
U.S. Appl. No. 14/694,661, Amendment and Response filed Jul. 6, 2016, 17 pages.
U.S. Appl. No. 14/694,661, Notice of Allowance dated Jul. 20, 2016, 8 pages.
U.S. Appl. No. 14/694,661, Office Action dated Jan. 22, 2016, 16 pages.
U.S. Appl. No. 14/694,661, Office Action dated May 5, 2016, 24 pages.
U.S. Appl. No. 14/694,661, Response to 1.312 Amendment dated Sep. 20, 2016, 2 pages.

* cited by examiner

PINNING A CALLOUT ANIMATION

CROSS-REFERENCE TO RELATED APPLICATIONS

This patent application is a continuation of U.S. patent application Ser. No. 14/694,661, filed Apr. 23, 2015 and entitled "Pinning a Callout Animation", now issued U.S. Pat. No. 9,489,761, which is a continuation of Ser. No. 13/274,828, filed Oct. 17, 2011 and entitled "Pinning a Callout Animation," the disclosures of which are incorporated herein, in their entirety, by reference.

BACKGROUND

Computer productivity applications include functionality for attaching or "pinning" various user interface ("UI") elements to displayed content. For example, a productivity application may include functionality allowing a user to initiate the display of a calendar UI element within an e-mail application and subsequently pin the calendar as a task pane at another location within the e-mail application. A drawback associated with the aforementioned functionality is that the pinning of content elements is displayed to the user in an instantaneous manner. That is, users are not provided with a sense of how a particular UI element transitions from its initial position in the display prior to being pinned. This lack of transitioning behavior may be confusing and jarring to many users. It is with respect to these considerations and others that the various embodiments described herein have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for animating the attachment of content items to a location on a content surface in a user interface. A user interface showing a content surface may be displayed on a computer. The content surface may include a content item at an initial position above the content surface. The content surface may display content formatted for display over an area comprising a totality of the content surface. The computer may then receive in the user interface a request to attach the content item to a final position on the content surface. The computer may then display an animation of the content item moving, from the initial position, across the content surface until the final position has been reached. The computer may then attach the content item to the content surface at the final position.

These and other features and advantages will be apparent from a reading of the following detailed description and a review of the associated drawings. It is to be understood that both the foregoing general description and the following detailed description are illustrative only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 7 is a computer screen display of a user interface showing another content item attached to a final position on a content surface, in accordance with an embodiment;

FIG. 8 is a computer screen display of a user interface showing yet another content item prior to being attached to a content surface, in accordance with an embodiment;

DETAILED DESCRIPTION

Embodiments are provided for animating the attachment of content items to a location on a content surface in a user interface. A user interface showing a content surface may be displayed on a computer. The content surface may include a content item at an initial position above the content surface. The content surface may display content formatted for display over an area comprising a totality of the content surface. The computer may then receive in the user interface a request to attach the content item to a final position on the content surface. The computer may then display an animation of the content item moving, from the initial position, across the content surface until the final position has been reached. The computer may then attach the content item to the content surface at the final position.

Figure 1:
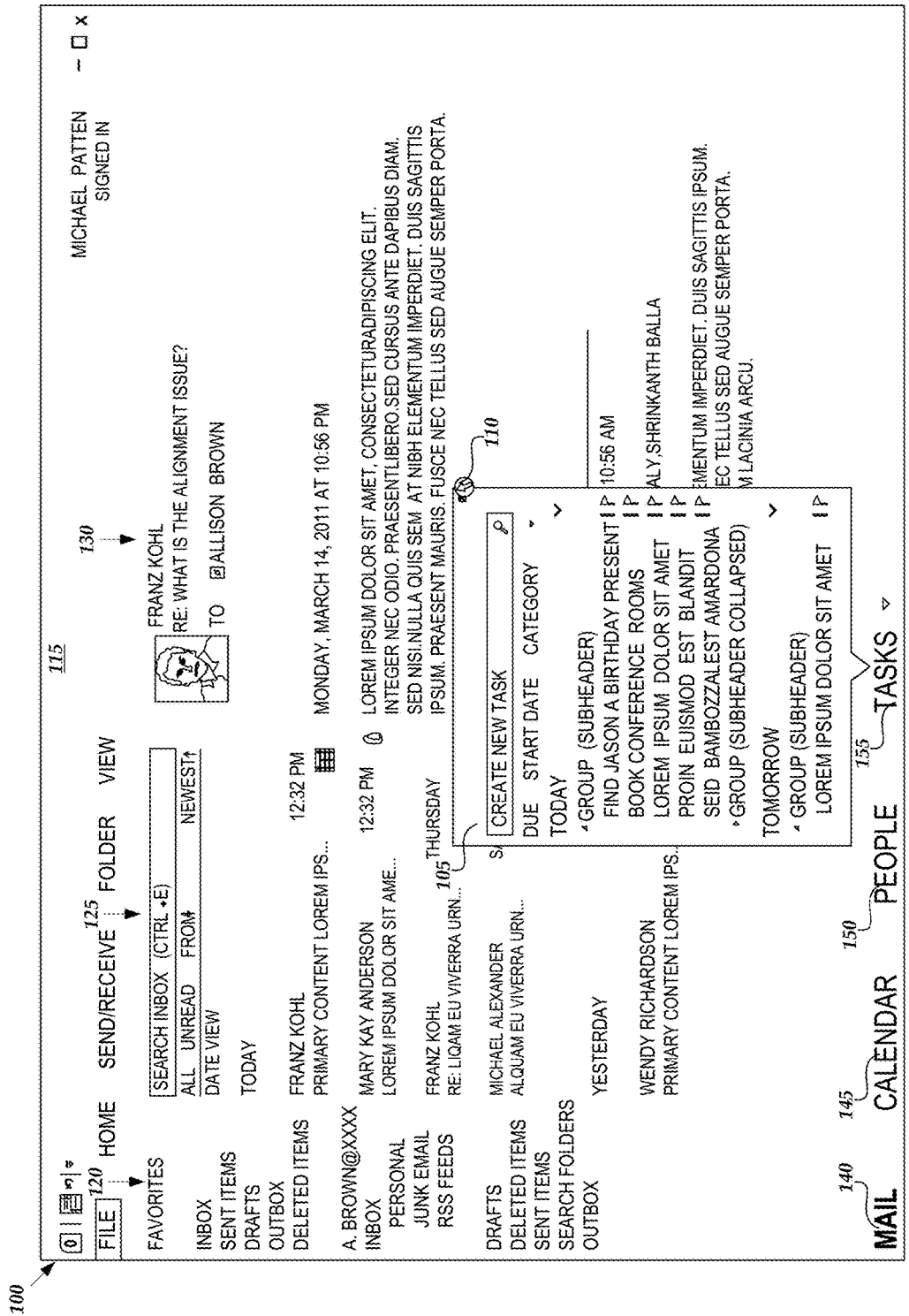
FIG. 1 is a computer screen display of a user interface showing a content item prior to being attached to a content surface, in accordance with an embodiment.

FIG. 1 of a user interface 100 showing a content item prior to being attached to a content surface 115, in accordance with an embodiment. The user interface 100 may be generated by a productivity application executed by a computer. In accordance with an embodiment, the productivity application may include a personal information management software application such as the OUTLOOK personal information management software from MICROSOFT CORPORATION of Redmond Wash. It should be understood, however, that other personal information software applications from other manufacturers also may be utilized in accordance with the various embodiments described herein. It should be appreciated by those skilled in the art that other productivity applications may also be utilized in accordance with the various embodiments described herein. The other productivity applications may include, but are not limited to, word processing software, presentation graphics software, spreadsheet software, diagramming software, project management software, publishing software and note-taking software. It should be appreciated that the aforementioned productivity applications may comprise individual application programs or alternatively, may be incorporated into a suite of productivity applications such as the OFFICE application program suite from MICROSOFT CORPORATION. The content surface 115 in the user interface 100 displays electronic mail ("e-mail") content associated with a user. In accordance with an embodiment, the content displayed on the content surface 115 may be organized according to various content task panes 120, 125 and 130. For example, the content task pane 120 comprises a list of mailboxes associated with a user, the content task pane 125 comprises a list view of e-mail messages in a user's Inbox and the content task pane 130 comprises the content of an e-mail message associated with a currently selected e-mail message (i.e., the first message in the list view of e-mail messages). The content surface 115 also includes various text labels including Mail text label 140, Calendar text label 145, People text label 150 and Tasks text label 155 which identify various types of personal information management content (i.e., e-mail, a calendar, a contacts list and a tasks list). In accordance with an embodiment, the text labels 144, 150 and 155 may be selected to display a content item or "callout" associated with the personal information management content identified by each text label. For example, the selection of the Tasks text label 155 generates the display of content item 105 (alternatively referred to herein as the "callout 105") showing various task items over the content surface 115. As defined herein, a callout may comprise a floating piece of user interface content which sits above the content surface of the user interface 100 generated by the productivity application. The callout 105 may also include an icon 110 in the upper right corner which may be selected (e.g., by clicking on an input device or via a touch gesture) to animate the callout 105 across the content surface 115 and to attach or "pin" the callout 105 to the content surface 115. The animation of callouts will be described in greater detail below.

Figure 2:
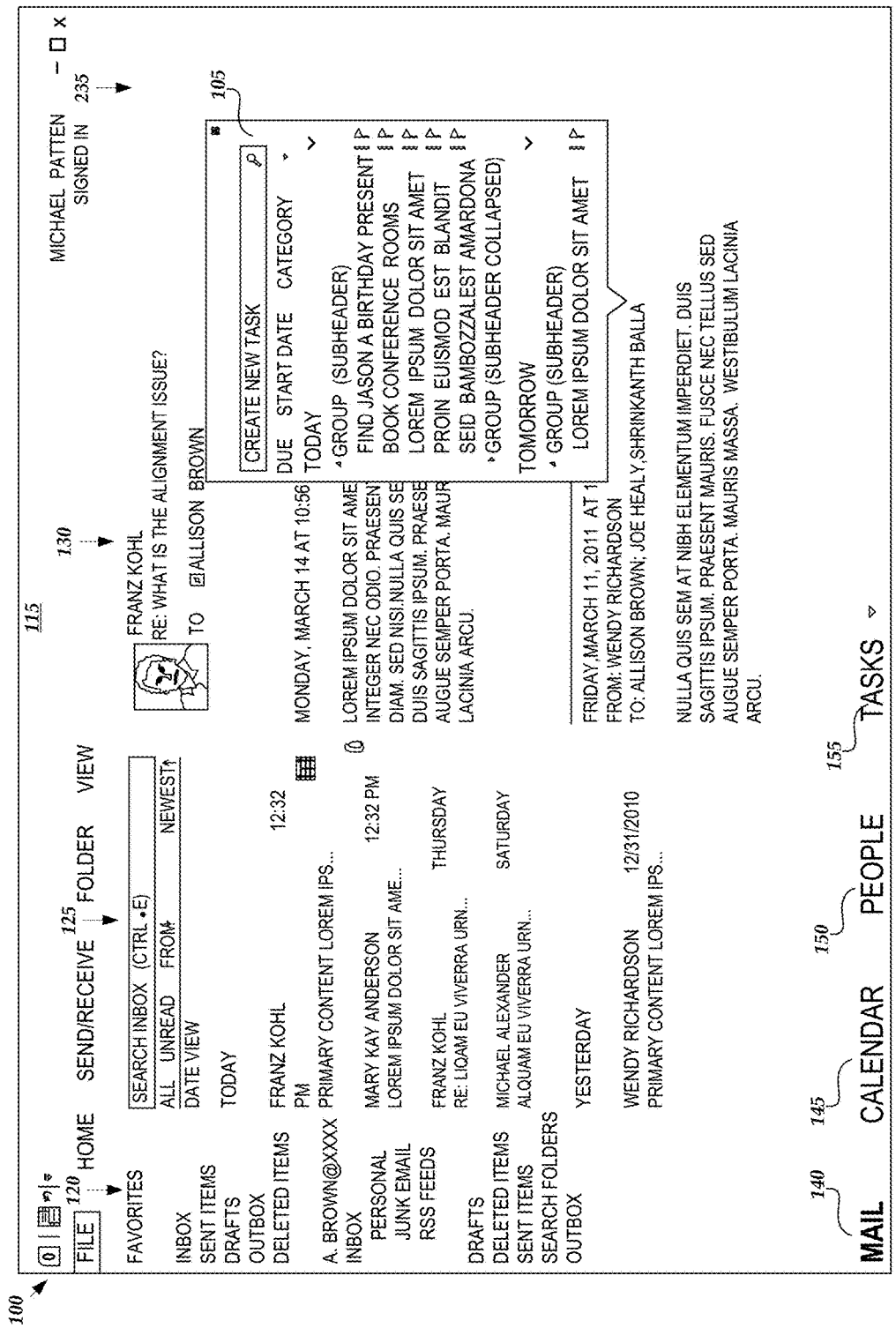
FIG. 2 is a computer screen display of a user interface showing an animation stage of a content item moving towards a final position on a content surface, in accordance with an embodiment.

FIG. 2 is a computer screen display of the user interface 100 showing an animation stage of the content item 105 moving towards a final position 235 on the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 2, the animation of the callout 105 is shown at a stage in which the callout 105 is moving toward but has not yet reached the final position 235 on the content surface 115. It should be understood that the final position 235 may comprise a predefined area on the content surface 115 determined by the productivity application and which is utilized by the productivity application for attaching or "pinning" callouts. In accordance with an embodiment, the productivity application may make space on the content surface 115 for pinning callouts by automatically resizing the content in the task panes 120, 125 and 130 (and therefore the task panes themselves). For example, the productivity application may resize the content in the task panes 120, 125 and 130 as the callout 105 moves across the screen towards the final position 235 located near the right edge of the content surface. Alternatively, the productivity application may delay resizing the content in the task panes 120, 125 and 130 until after the callout has reached the final position 235.

Figure 3:
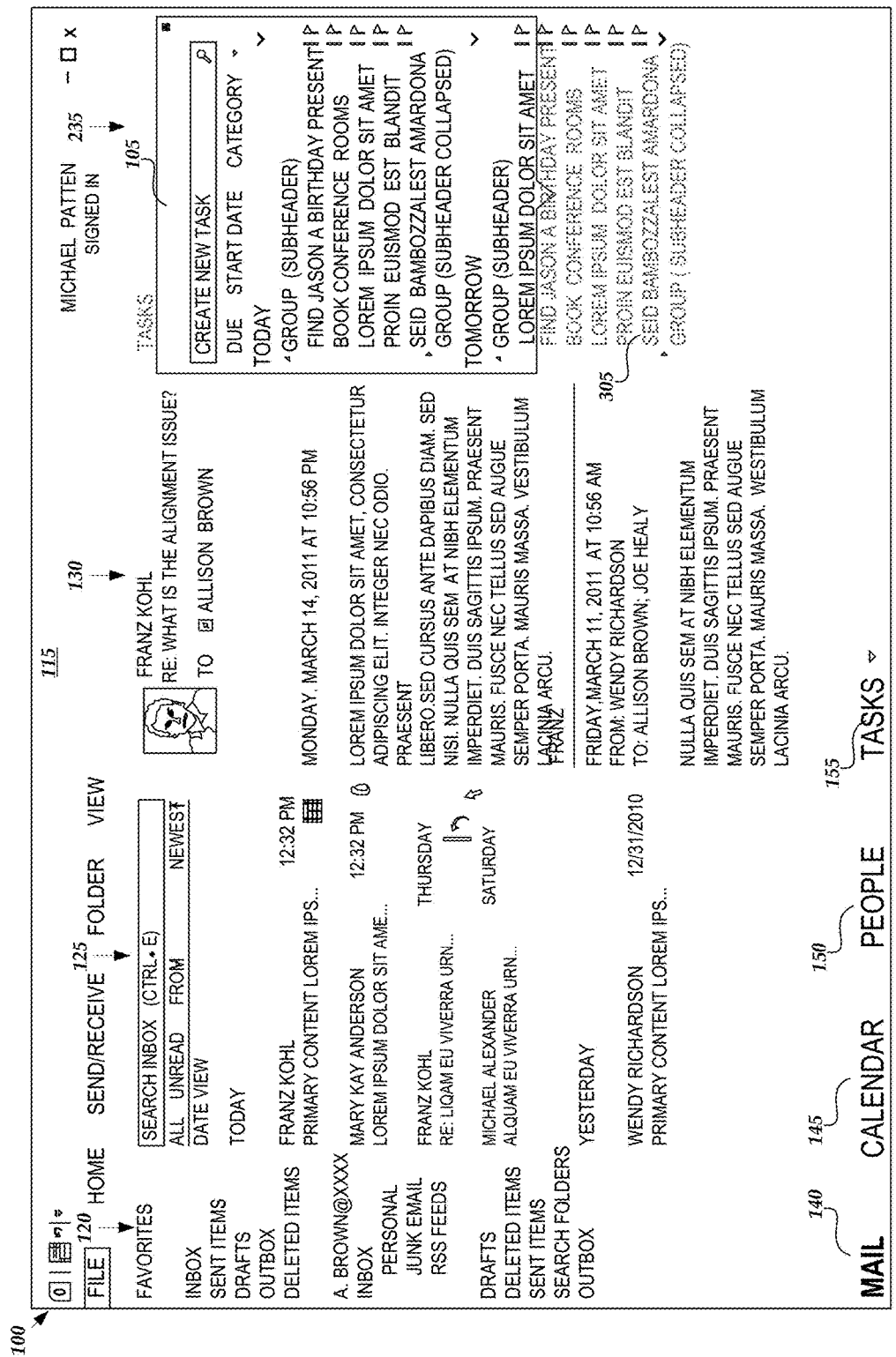
FIG. 3 is a computer screen display of a user interface showing another animation stage of a content item at a final position on a content surface, in accordance with an embodiment.

FIG. 3 is a computer screen display of the user interface 100 showing another animation stage of the content item 105 at the final position 235 on the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 3, the animation of the callout 105 is shown at a stage in which the callout 105 has reached the final position 235 on the content surface 115. As will be described in greater detail below, once the animated callout 105 has reached the final position 235, the movement of the callout 105 is stopped and the callout 105 then makes a cross fade transition into a final docked state as a task pane in the content surface 115. For example, as shown in FIG. 3, portion 305 of the callout 105 is in the process of cross fading from a position above the content surface 115 to a position within the content surface 115.

Figure 4:
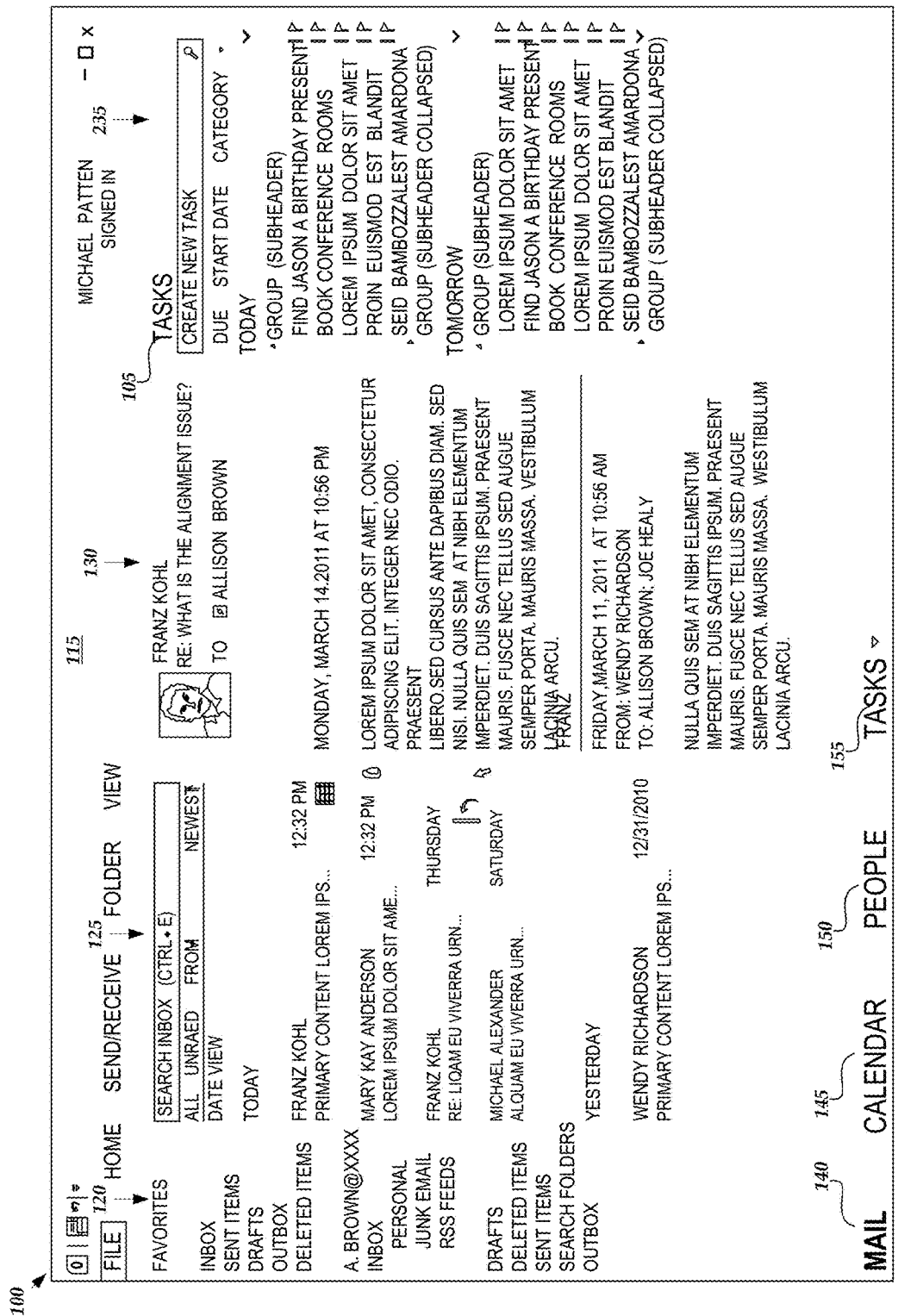
FIG. 4 is a computer screen display of a user interface showing a content item attached to a final position on a content surface, in accordance with an embodiment.

FIG. 4 is a computer screen display of the user interface 100 showing the content item 105 attached (i.e., pinned) to the final position 235 on the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 4, the callout 105 is shown as integrated into the content surface 115 as a task pane. As will be discussed in greater detail below, once the callout 105 reaches the final position 235 and completes the cross fade transition into a final docked state, the callout 105 becomes a task pane that is on the same surface as the content surface.

Figure 5:
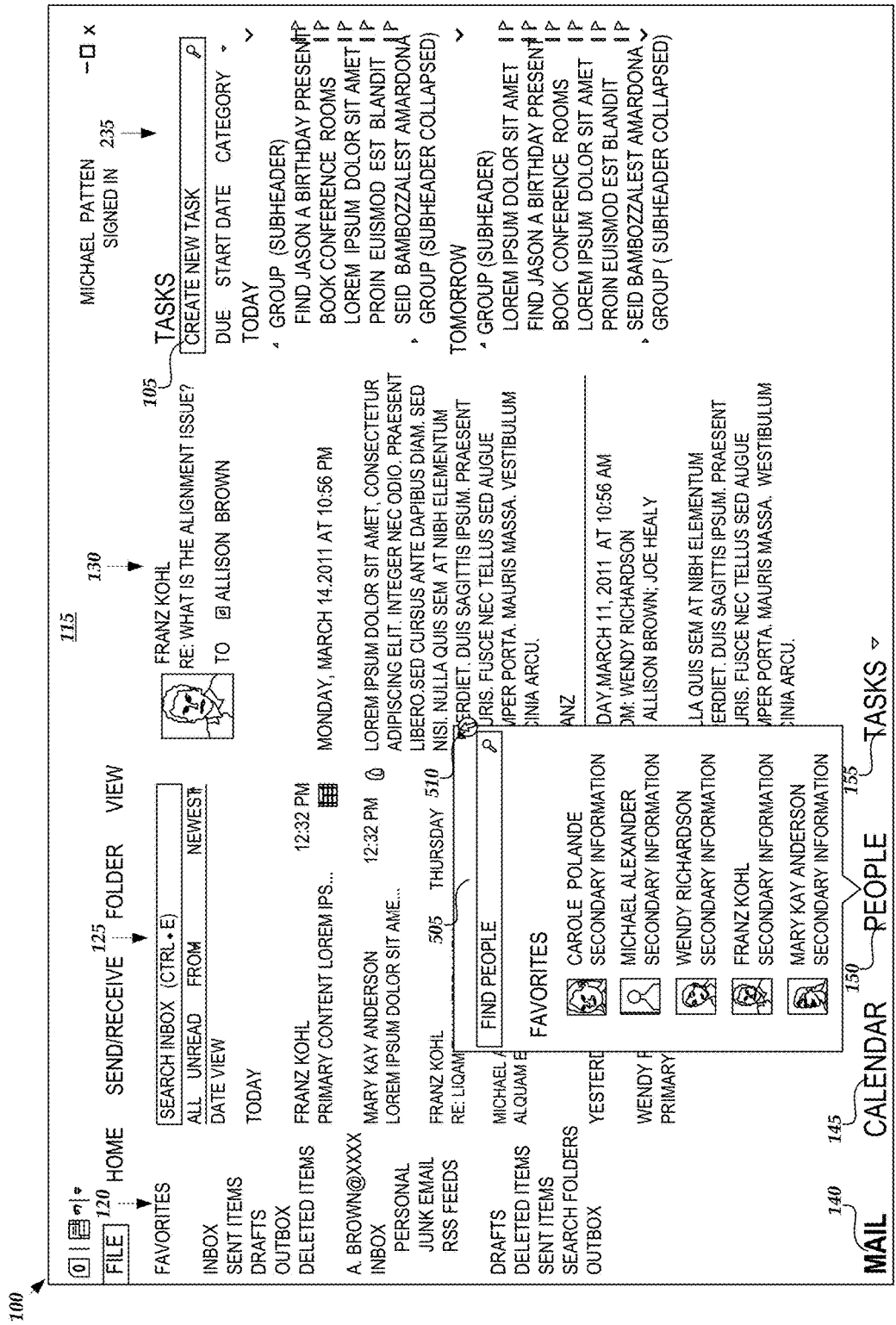
FIG. 5 is a computer screen display of a user interface showing another content item prior to being attached to a content surface, in accordance with an embodiment.

FIG. 5 is a computer screen display of a user interface 100 showing another content item prior to being attached to the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 5, the content surface 115 also displays the docked callout 105. Further in FIG. 5, a new or additional content item (i.e., callout 505) is displayed over the content surface 115 as a result of a selection of the People text label 150, which shows a contacts list. The callout 505 may also include an icon 510 in the upper right corner which may be selected (e.g., by clicking on an input device or via a touch gesture) to animate the callout 505 across the content surface 115 and to attach or "pin" the callout 505 to the content surface 115, as will be described in greater detail below.

Figure 6:
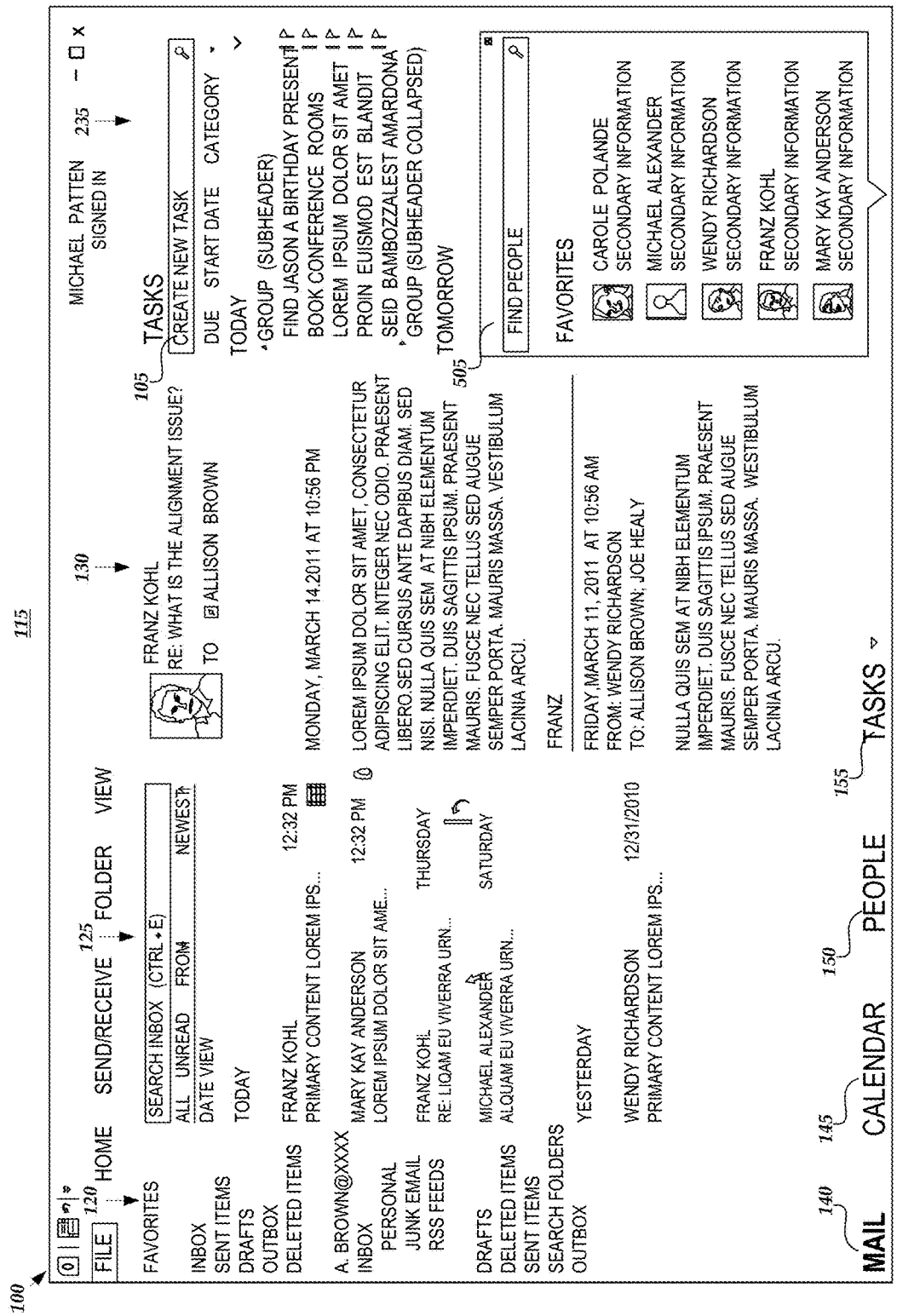
FIG. 6 is a computer screen display of a user interface showing another content item at a final position on a content surface, in accordance with an embodiment.

FIG. 6 is a computer screen display of the user interface 100 showing the content item 505 at the final position 235 on a content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 6, the animation of the callout 505 is shown at a stage in which the callout 505 has reached the final position 235 on the content surface 115 after moving across the content surface 115 in a similar fashion as that described above with respect to the movement of the callout 105 in FIG. 2. In accordance with an embodiment, the callout 505 may be displayed as hovering over a lower portion of the callout 105 on the content surface 115.

Figure 7:
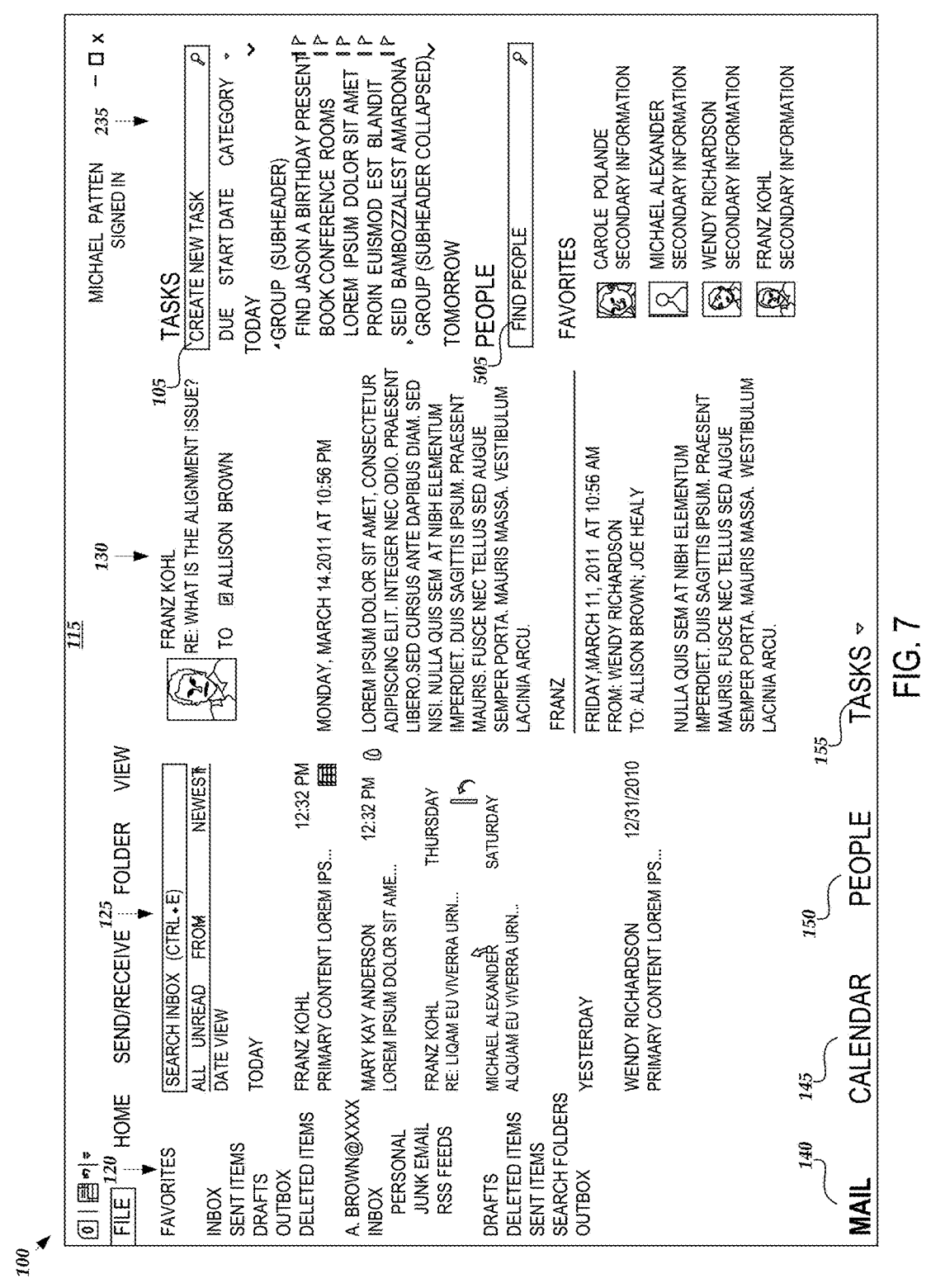

FIG. 7 is a computer screen display of the user interface 100 showing the content item 505 attached (i.e., pinned) to the final position 235 on the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 7, the callout 505 is shown as integrated into or "docked" to the content surface 115 below the callout 105. It should be understood that the callout 105 has been resized by the productivity application to provide space for displaying the callout 505 at the final position 235 on the content surface 115. It should further be understood, that the callout 505 may undergo a similar cross fade transition as described above with respect to the callout 105. That is, the callout 505 may undergo a cross fade transition from a position above the content surface 115 to a task pane that is on the same surface as the content surface 115.

Figure 8:
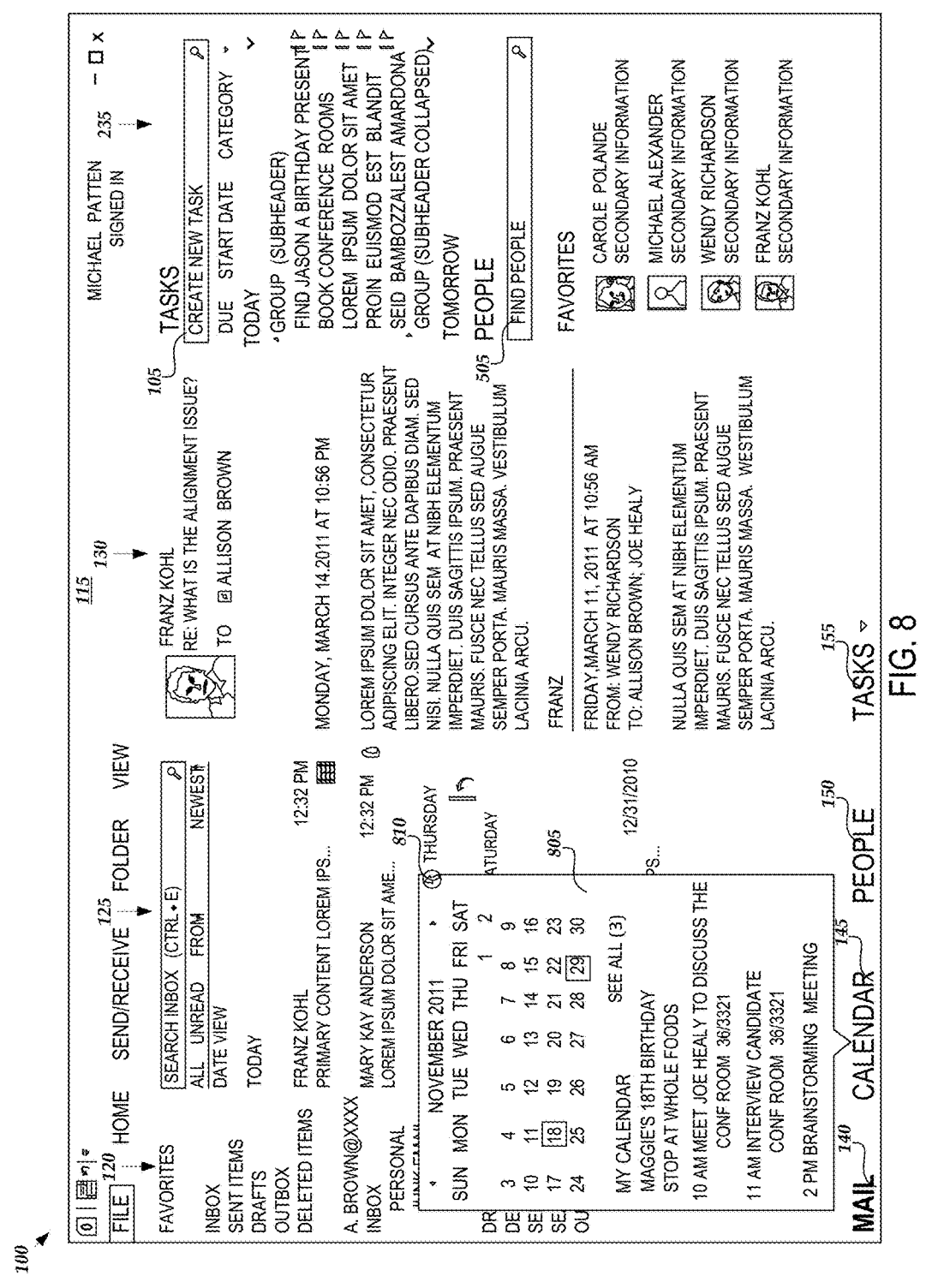

FIG. 8 is a computer screen display of a user interface 100 showing yet another content item prior to being attached to the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 8, the content surface 115 also displays the docked callouts 105 and 505. Further in FIG. 8, a new or additional content item (i.e., callout 805) is displayed over the content surface 115 as a result of a selection of the Calendar text label 150, which shows a calendar. The callout 805 may also include an icon 810 in the upper right corner which may be selected (e.g., by clicking on an input device or via a touch gesture) to animate the callout 805 across the content surface 115 and to attach or "pin" the callout 805 to the content surface 115, as will be described in greater detail below.

Figure 9:
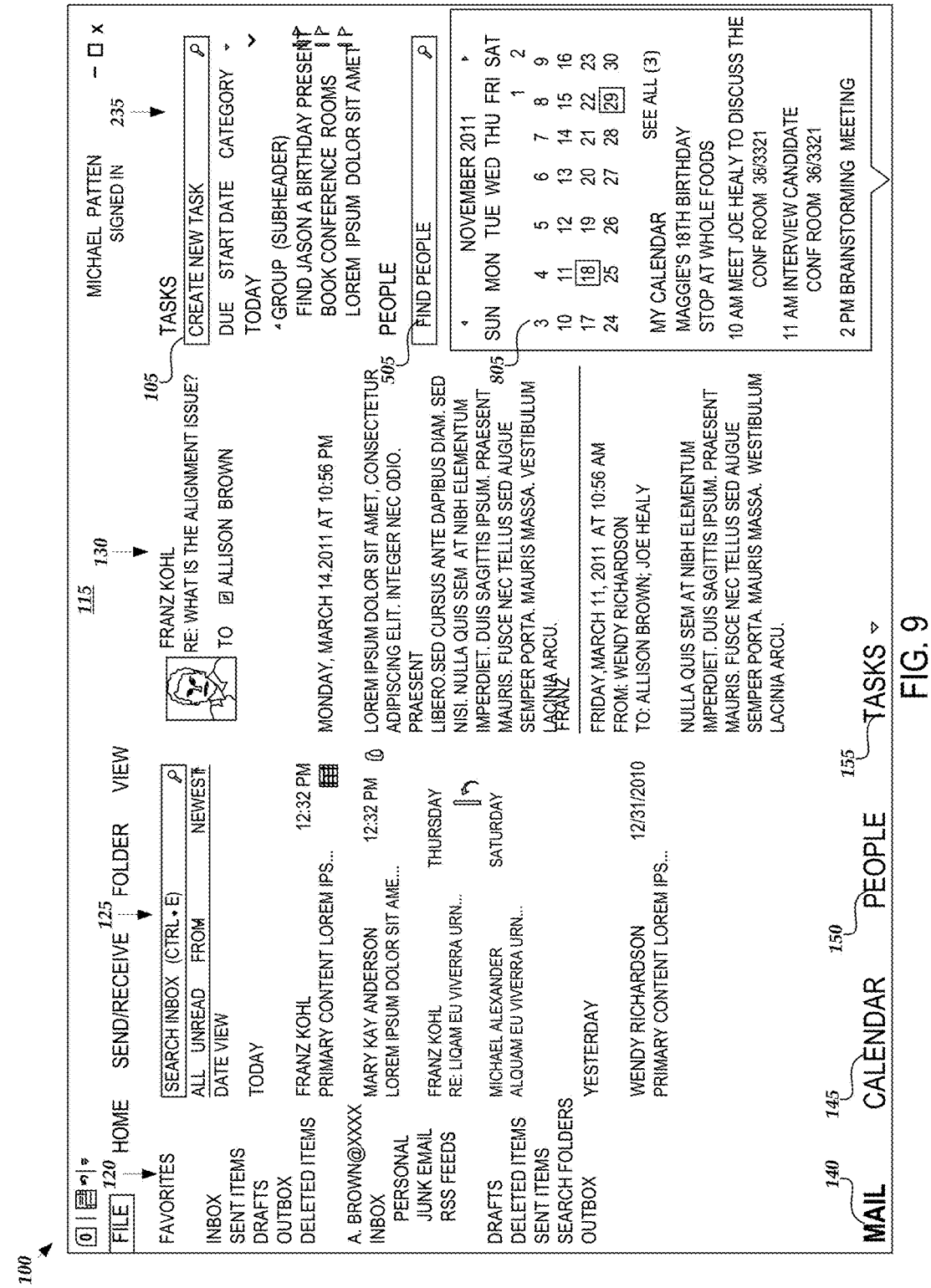
FIG. 9 is a computer screen display of a user interface showing yet another content item at a final position on a content surface, in accordance with an embodiment.

FIG. 9 is a computer screen display of the user interface 100 showing the content item 505 at the final position 235 on a content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 9, the animation of the callout 805 is shown at a stage in which the callout 805 has reached the final position 235 on the content surface 115 after moving across the content surface 115 in a similar fashion as that described above with respect to the movement of the callout 105 in FIG. 2. In accordance with an embodiment, the callout 805 may be displayed as hovering over a lower portion of the callout 505 on the content surface 115.

Figure 10:
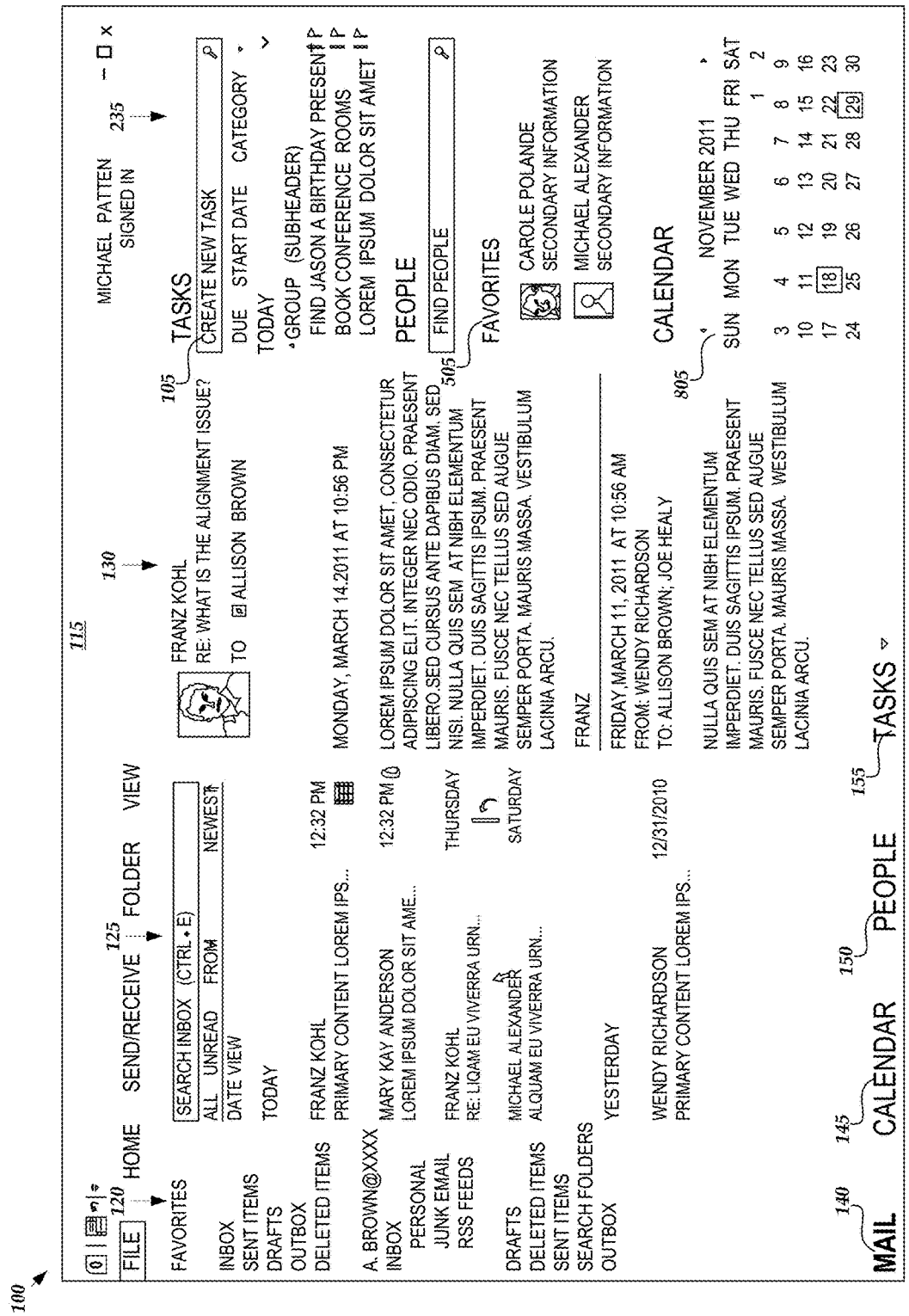
FIG. 10 is a computer screen display of a user interface showing yet another content item attached to a final position on a content surface, in accordance with an embodiment.

FIG. 10 is a computer screen display of the user interface 100 showing the content item 805 attached (i.e., pinned) to the final position 235 on the content surface 115, in accordance with an embodiment. As discussed above with respect to FIG. 1, the content surface 115 displays various content associated with e-mail in the task panes 120, 125 and 130 and further displays the Mail text label 140, the Calendar text label 145, the People text label 150 and the Tasks text label 155 which identify various types of personal information management content (i.e., e-mail, a calendar, a contacts list and a tasks list). In FIG. 10, the callout 805 is shown as integrated into or "docked" to the content surface 115 below the docked callouts 105 and 505. It should be understood that the callouts 105 and 505 have been resized by the productivity application to provide space for displaying the callout 805 at the final position 235 on the content surface 115. It should further be understood, that the callout 805 may undergo a similar cross fade transition as described above with respect to the callout 105. That is, the callout 805 may undergo a cross fade transition from a position above the content surface 115 to a task pane that is on the same surface as the content surface 115.

Figure 11:
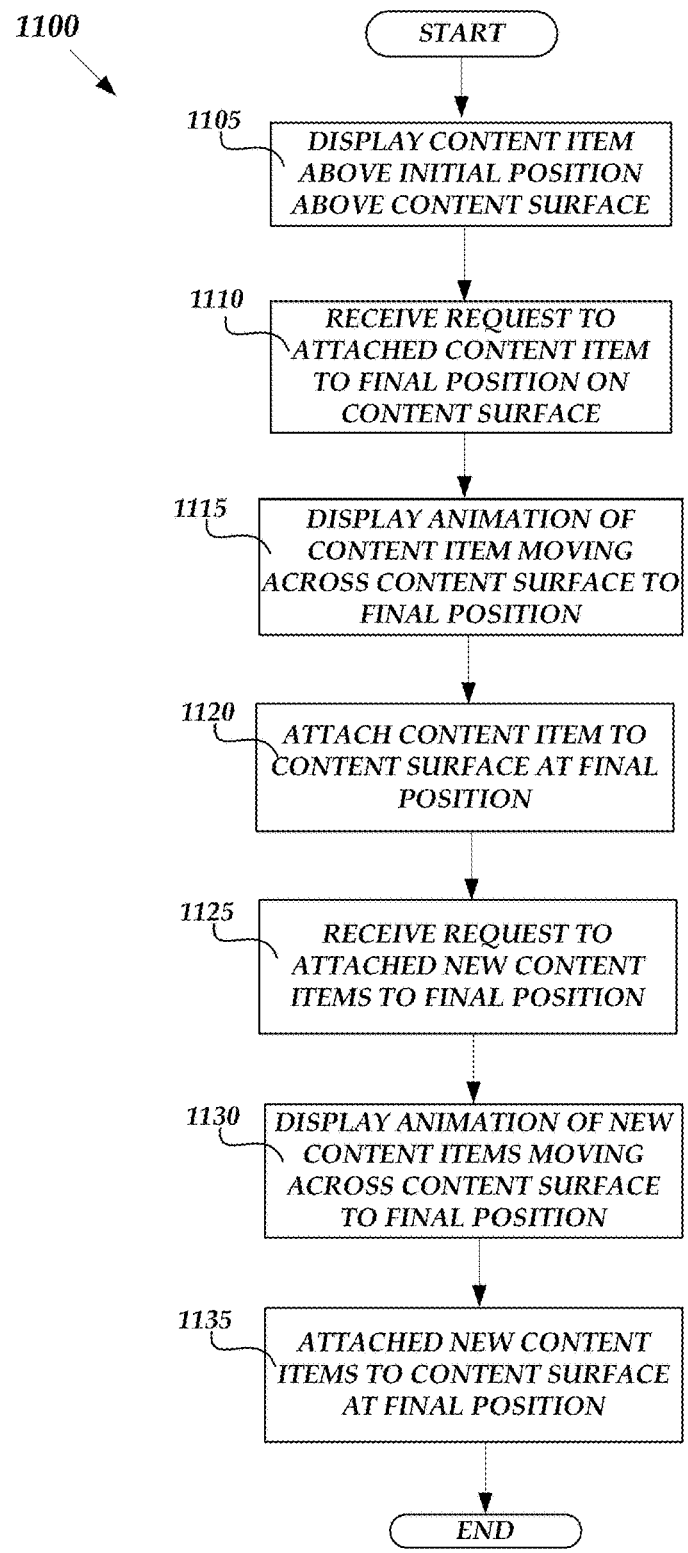
FIG. 11 is a flow diagram illustrating a routine for animating the attachment of content items to a location on a content surface in a user interface, in accordance with an embodiment.

FIG. 11 is a flow diagram illustrating a routine 1100 for animating the attachment of content items to a location on a content surface (i.e., animating the pinning of callouts) in a user interface, in accordance with an embodiment. When reading the discussion of the routine presented herein, it should be appreciated that the logical operations of various embodiments are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the various embodiments. Accordingly, the logical operations illustrated in FIG. 11 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the various embodiments as recited within the claims set forth herein.

The routine 1100 begins at operation 1105, where a computing device may be utilized to execute a productivity application for displaying in a user interface, a content item or callout at an initial position above a content surface. In accordance with an embodiment, the initial position of the content item may be displayed as floating above the content surface in the user interface. It should be understood that, prior to displaying the content item, the productivity application may receive a selection of the content item or callout from the content surface. For example, as discussed above with respect to FIG. 1, a callout may be selected from a displayed text label on the content surface of a user interface. In accordance with an embodiment, the content item may comprise a callout selected from a group including at least a tasks list, a contacts list and a calendar in a personal information management application. It should be understood that other content items in other productivity applications (including productivity application suites comprising multiple applications) may also be utilized in accordance with various embodiments. For example, content items from word processing applications, presentation graphics applications, spreadsheet applications, diagramming applications, project management applications, publishing applications and note-taking applications may be utilized without departing from the spirit and scope of the embodiments described herein.

From operation 1105, the routine 1100 continues to operation 1110, where the productivity application executing on the computing device may receive in the user interface, request to attach the content item to a final position on the content surface. For example, the productivity application may receive a user request to pin a callout to a predetermined position on the content surface for displaying callouts. In particular, as discussed above with respect to FIG. 1, a displayed callout may include an icon which may be selected by a (e.g., by clicking on an input device or via a touch gesture) to animate the callout across the content surface and to attach or pin the callout to the content surface.

From operation 1110, the routine 1100 continues to operation 1115, where the productivity application executing on the computing device may display in the user interface, an animation of the content item moving, from the initial position, across the content surface until the final position has been reached. It should be understood that, in accordance with embodiments, the productivity application in animating the movement of the content item across the content surface may resize content in the content surface to make space for the content item at the final position. In particular, the productivity application may be configured to either resize content in the content surface to make space for the content item as the content item moves across the content surface towards the final position or resize content in the content surface to make space for the content item upon the content item reaching the final position.

From operation 1115, the routine 1100 continues to operation 1120, where the productivity application executing on the computing device may attach in the user interface, the content item to the content surface at the final position. In particular, the productivity application may be configured to display a cross-fade animation showing a transition of the content item from a position above the content surface at the final position to a docked state within the content surface at the final position. It should be understood that, while in the docked state at the final position, the content item may comprise a task pane in the user interface.

From operation 1120, the routine 1100 continues to operation 1125, where the productivity application executing on the computing device may receive in the user interface, a request to attach one or more new content items to the final position on the content surface.

From operation 1125, the routine 1100 continues to operation 1130, where the productivity application executing on the computing device may display in the user interface, an animation of each new content item moving across the content surface until the final position has been reached.

From operation 1130, the routine 1100 continues to operation 1135, where the productivity application executing on the computing device may attach in the user interface, the new content items to the content surface at the final position. It should be understood that the productivity application, in attaching the new content items, may be configured to resize previously docked content items to make space for the new content items at the final position. It should be understood that, while attached to the content surface (i.e., in a docked state) at the final position, the new content items may comprise task panes in the user interface. From operation 1135, the routine 1100 then ends.

Figure 12:
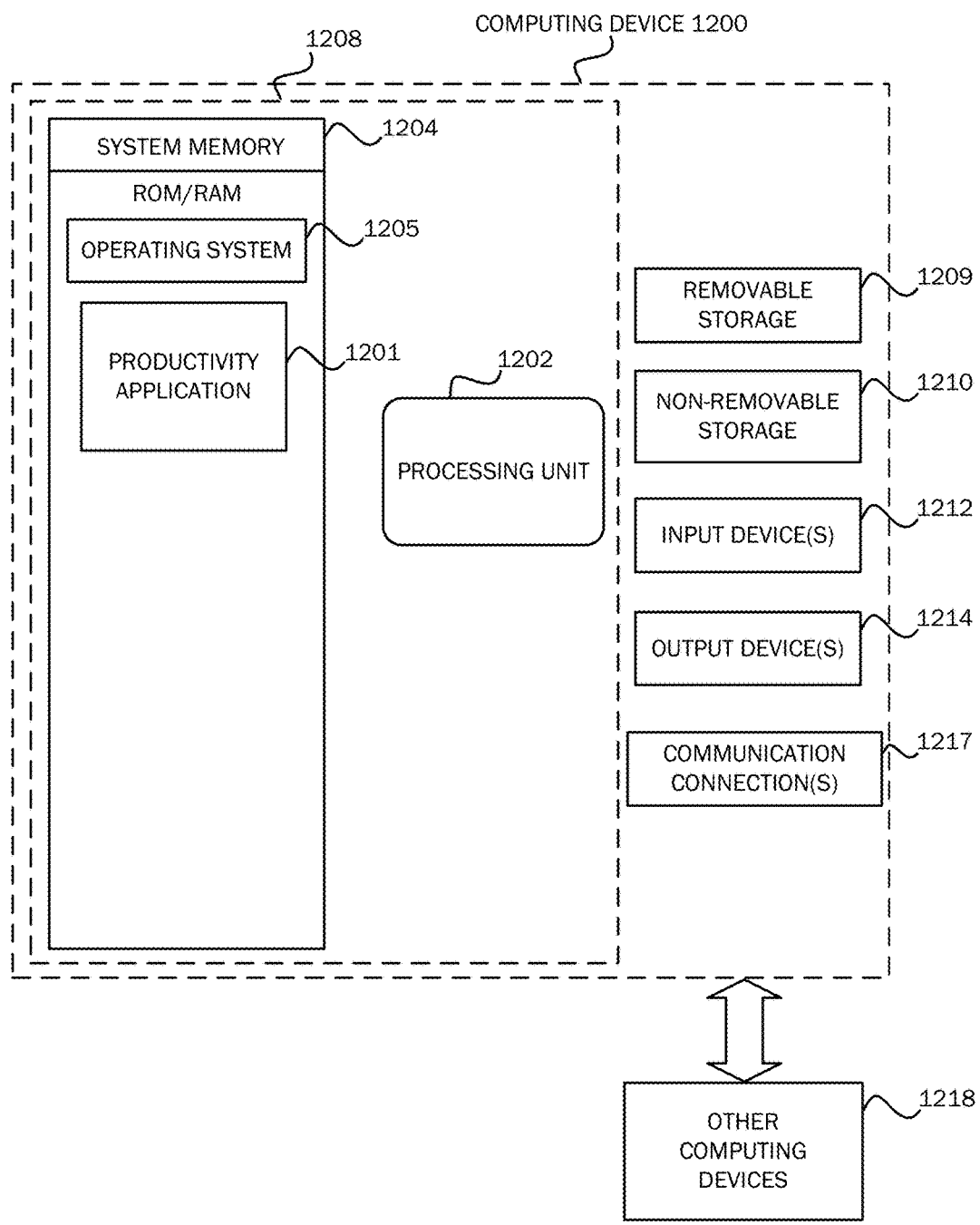
FIG. 12 is a simplified block diagram of a computing device with which various embodiments may be practiced.

FIG. 12 is a block diagram illustrating example physical components of a computing device 1200 with which various embodiments may be practiced. The computing device components described below may be suitable for the computing device described above with respect to FIG. 11. In a basic configuration, the computing device 1200 may include at least one processing unit 1202 and a system memory 1204. Depending on the configuration and type of computing device, system memory 1504 may comprise, but is not limited to, volatile (e.g. random access memory (RAM)), non-volatile (e.g. read-only memory (ROM)), flash memory, or any combination. System memory 1204 may include an operating system 1205 and productivity application 1201. Operating system 1205, for example, may be suitable for controlling computing device 1200's operation and, in accordance with an embodiment, may comprise the WINDOWS operating systems from MICROSOFT CORPORATION of Redmond, Wash. It should be understood that the embodiments described herein may also be practiced in conjunction with other operating systems and application programs and further, is not limited to any particular application or system.

The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210.

While executing on the processing unit 1202 of the computing device 1200, the productivity application 1201 may perform a routine for animating the attachment of content items to a location on a content surface in a user interface including, for example, one or more of the operations in the routine 1100 described above. The aforementioned routine is illustrative, and the processing unit 1202 may perform other routines. Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the productivity application 1201 may operate via application-specific logic integrated with other components of the computing device/system 1200 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1200. Any such computer storage media may be part of the computing device 1200. The computing device 1200 may also have input device(s) 1212 such as a keyboard, a mouse, a pen, a sound input device, a touch input device, etc. Output device(s) 1214 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13A:
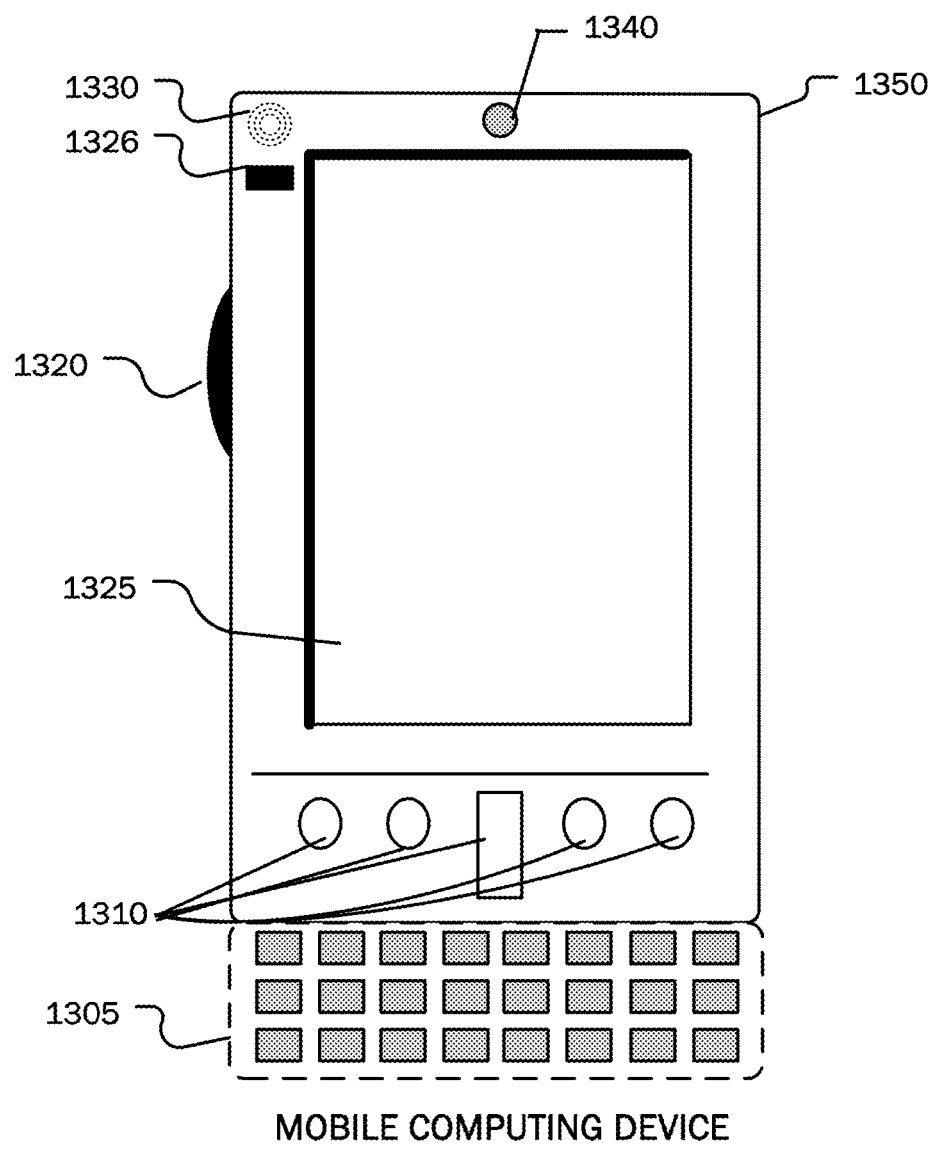
FIG. 13A is a simplified block diagram of a mobile computing device with which various embodiments may be practiced.
Figure 13B:
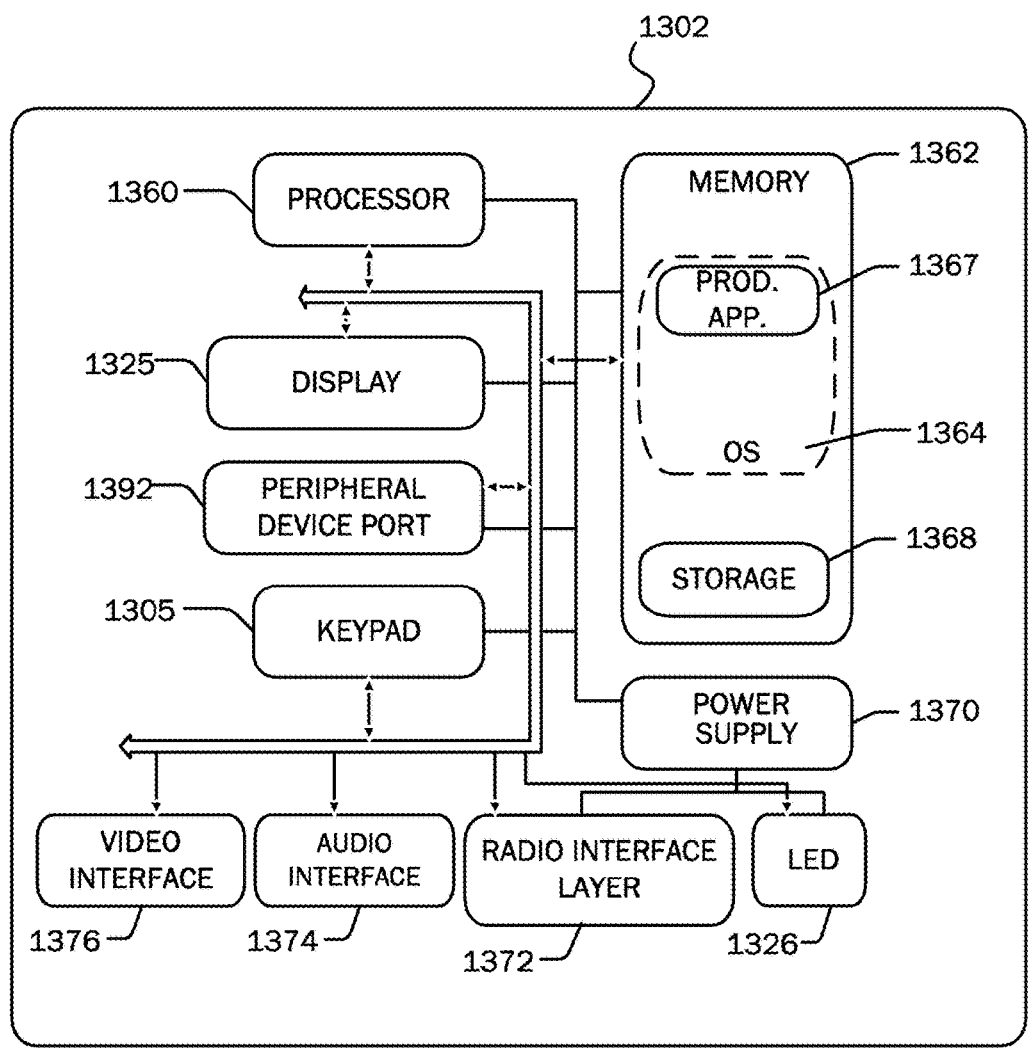
FIG. 13B is a simplified block diagram of a mobile computing device with which various embodiments may be practiced.

FIGS. 13A and 13B illustrate a suitable mobile computing environment, for example, a mobile computing device 1350, a smartphone, a tablet personal computer, a laptop computer, and the like, with which various embodiments may be practiced. With reference to FIG. 13A, an example mobile computing device 1350 for implementing the embodiments is illustrated. In a basic configuration, mobile computing device 1350 is a handheld computer having both input elements and output elements. Input elements may include touch screen display 1325 and input buttons 1310 that allow the user to enter information into mobile computing device 1350. Mobile computing device 1350 may also incorporate an optional side input element 1320 allowing further user input. Optional side input element 1320 may be a rotary switch, a button, or any other type of manual input element. In alternative embodiments, mobile computing device 1350 may incorporate more or less input elements. For example, display 1325 may not be a touch screen in some embodiments. In yet another alternative embodiment, the mobile computing device is a portable phone system, such as a cellular phone having display 1325 and input buttons 1310. Mobile computing device 1350 may also include an optional keypad 1305. Optional keypad 1305 may be a physical keypad or a "soft" keypad generated on the touch screen display.

Mobile computing device 1350 incorporates output elements, such as display 1325, which can display a graphical user interface (GUI). Other output elements include speaker 1330 and LED light 1326. Additionally, mobile computing device 1350 may incorporate a vibration module (not shown), which causes mobile computing device 1350 to vibrate to notify the user of an event. In yet another embodiment, mobile computing device 1350 may incorporate a headphone jack (not shown) for providing another means of providing output signals.

Although described herein in combination with mobile computing device 1350, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 13B is a block diagram illustrating components of a mobile computing device used in one embodiment, such as the mobile computing device shown in FIG. 13A. That is, mobile computing device 1350 can incorporate a system 1302 to implement some embodiments. For example, system 1302 can be used in implementing a "smart phone" that can run one or more applications similar to those of a desktop or notebook computer such as, for example, the productivity application discussed above with respect to FIGS. 1-12 as well as other applications. In some embodiments, the system 1302 is integrated as a computing device, such as an integrated personal digital assistant (PDA) and wireless phone.

A productivity application 1367 may be loaded into memory 1362 and run on or in association with an operating system 1364. The spreadsheet application 1367 may be perform a routine for animating the attachment of content items to a location on a content surface in a user interface including, for example, one or more of the operations in routine 1100 described above. The system 1302 also includes non-volatile storage 1368 within memory the 1362. Non-volatile storage 1368 may be used to store persistent information that should not be lost if system 1302 is powered down. The productivity application 1367 may use and store information in the non-volatile storage 1368. A synchronization application (not shown) also resides on system 1302 and is programmed to interact with a corresponding synchronization application resident on a host computer to keep the information stored in the non-volatile storage 1368 synchronized with corresponding information stored at the host computer. As should be appreciated, other applications may also be loaded into the memory 1362 and run on the device 1350.

The system 1302 has a power supply 1370, which may be implemented as one or more batteries. The power supply 1370 might further include an external power source, such as an AC adapter or a powered docking cradle that supplements or recharges the batteries.

The system 1302 may also include a radio 1372 that performs the function of transmitting and receiving radio frequency communications. The radio 1372 facilitates wireless connectivity between the system 1302 and the "outside world," via a communications carrier or service provider. Transmissions to and from the radio 1372 are conducted under control of OS 1364. In other words, communications received by the radio 1372 may be disseminated to the productivity application 1367 via OS 1364, and vice versa.

The radio 1372 allows the system 1302 to communicate with other computing devices, such as over a network. The radio 1372 is one example of communication media. The embodiment of the system 1302 is shown with two types of notification output devices: an LED 1380 that can be used to provide visual notifications and an audio interface 1374 that can be used with speaker 1330 to provide audio notifications. These devices may be directly coupled to the power supply 1370 so that when activated, they remain on for a duration dictated by the notification mechanism even though processor 1360 and other components might shut down for conserving battery power. The LED 1380 may be programmed to remain on indefinitely until the user takes action to indicate the powered-on status of the device. The audio interface 1374 is used to provide audible signals to and receive audible signals from the user. For example, in addition to being coupled to speaker 1330, the audio interface 1374 may also be coupled to a microphone (not shown) to receive audible input, such as to facilitate a telephone conversation. In accordance with embodiments, the microphone may also serve as an audio sensor to facilitate control of notifications. The system 1302 may further include a video interface 1376 that enables an operation of on-board camera 1330 to record still images, video stream, and the like.

A mobile computing device implementing the system 1302 may have additional features or functionality. For example, the device may also include additional data storage devices (removable and/or non-removable) such as, magnetic disks, optical disks, or tape. Such additional storage is illustrated in FIG. 13B by storage 1368.

Data/information generated or captured by the device 1350 and stored via the system 1302 may be stored locally on the device 1350, as described above, or the data may be stored on any number of storage media that may be accessed by the device via the radio 1372 or via a wired connection between the device 1350 and a separate computing device associated with the device 1350, for example, a server computer in a distributed computing network such as the Internet. As should be appreciated such data/information may be accessed via the device 1350 via the radio 1372 or via a distributed computing network. Similarly, such data/information may be readily transferred between computing devices for storage and use according to well-known data/information transfer and storage means, including electronic mail and collaborative data/information sharing systems.

Figure 14:
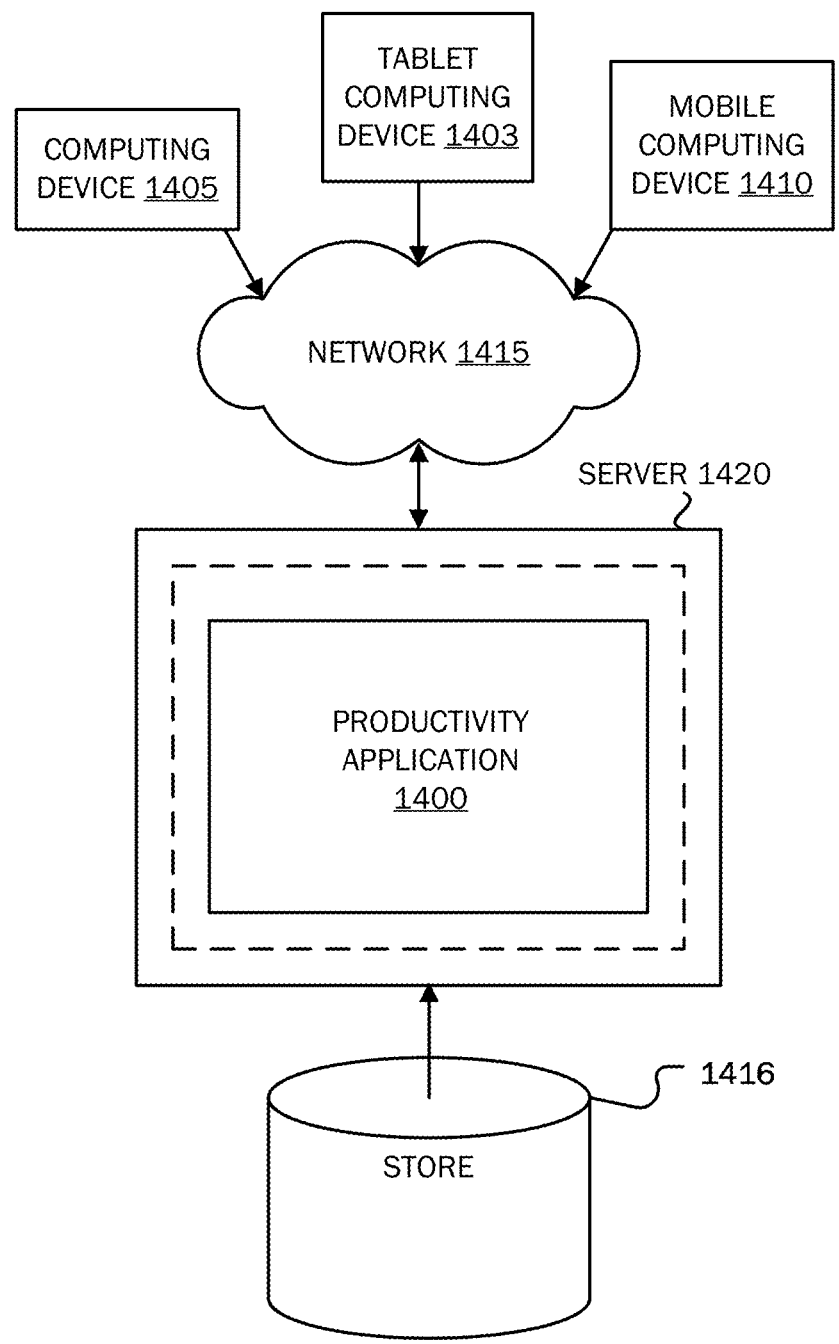
FIG. 14 is a simplified block diagram of a distributed computing system in which various embodiments may be practiced.

FIG. 14 is a simplified block diagram of a distributed computing system in which various embodiments may be practiced. The distributed computing system may include number of client devices such as a computing device 1405, a tablet computing device 1403 and a mobile computing device 1410. The client devices 1405, 1403 and 1410 may be in communication with a distributed computing network 1415 (e.g., the Internet). A server 1420 is in communication with the client devices 1405, 1403 and 1410 over the network 1415. The server 1420 may store productivity application 1400 which may be utilized to perform a routine for animating the attachment of content items to a location on a content surface in a user interface including, for example, one or more of the operations in routine 1100 described above. The productivity application 1400 on the server 1420 may be utilized by the client devices 1405, 1403 and 1410 (over the network 1415) to generate electronic documents and for storing same in a store 1416.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer system for animating pinning of callouts to a content surface in an application, comprising:
   a memory for storing executable program code; and
   a processor, functionally coupled to the memory, the processor being responsive to computer-executable instructions contained in the program code and operative to:

display content on the content surface of the application, wherein the content surface does not include any item that is configured to float above or cover the content;
receive a first callout selection in the application;
in response to the first callout selection, display a first callout in a first floating user interface piece that is separate from and floats above the content surface, wherein the first callout provides items that are not displayed immediately prior to the first callout selection;
receive a first pin selection of the first callout in the application;
in response to the first pin selection, pin the first callout to the content surface of the application, wherein pin the first callout comprises:
  animating movement of the first floating user interface piece across the content surface from a first location above the content surface to a first pin location within the content surface;
  animating a size adjustment of the content on the content surface as the first floating user interface piece moves across and above the content surface to adjust for a size of the first callout as pinned in the content surface to form a size adjusted content;
  removing the first floating user interface piece to integrate all of the first callout into the content surface; and
display a pinned first callout and the size adjusted content on the content surface.

2. The system of claim 1, wherein pinning the first callout further comprises:
  animating a fade-out of the first floating user interface piece after the first floating user interface piece reaches the first pin location; and
  animating a fade-in of the first callout as pinned within the content surface after the first floating user interface piece reaches the first pin location.

3. The system of claim 1, wherein the first callout selection is received from a selection of an item on the content surface.

4. The system of claim 1, wherein the first pin selection is received from a selection of an item on the first floating user interface piece.

5. The system of claim 1, wherein the processor is further operative to:
  after the first callout is pinned to the content surface, receive a second callout selection in the application;
  display, in response to the second callout selection, a second callout in a second floating user interface piece that is separate from and floats above the content surface;
  receive a second pin selection of the second callout in the application;
  in response to the second pin selection, pin the second callout to the content surface of the application, wherein pinning the second callout comprises:
    animating movement of the second floating user interface piece across and above the content surface from a second location to a second pin location within the content surface;
    animating a first resizing of the first callout on the content surface as the second floating user interface piece moves across and above the content surface to adjust for a size of the second callout as pinned in the content surface, wherein the content in the content surface is not resized again in response to the second pin selection;
  display a resized first pinned callout, a pinned second callout, and the size adjusted content on the content surface on the content surface.

6. The system of claim 5, wherein the first pin selection is received from a selection of an item on the second floating user interface piece.

7. The system of claim 5, wherein the processor is further operative to:
  after the second callout is pinned to the content surface, receive a third callout selection in the application;
  display, in response to the third callout selection, a third callout in a third floating user interface piece that is separate from and floats above the content surface;
  receive a third pin selection of the third callout in the application;
  in response to the third pin selection, pin the third callout to the content surface, wherein pinning the third callout comprises:
    animating movement of the third floating user interface piece across and above the content surface from a third location to a third pin location within the content surface;
    animating a second resizing of the first callout and a first resizing of the second callout on the content surface in the content surface as the third floating user interface piece moves across and above the content surface to adjust for a size of the third callout as pinned in the content surface, wherein the content in the content surface is not resized in response to the third pin selection;
  displaying a second resized first pinned callout, a first resized pinned second callout, the third callout, and the size adjusted content on the content surface.

8. The system of claim 5, wherein the first callout and the second callout comprise items selected from at least one of a tasks list, a contacts list, or a calendar.

9. A computer system for animating pinning of callouts to a location on a content surface in a user interface of an application, comprising:
  a memory for storing executable program code; and
  a processor, functionally coupled to the memory, the processor being responsive to computer-executable instructions contained in the program code and operative to:
    display content on the content surface of the application, wherein the content surface does not include any user interface pieces that are configured to float above or cover the content;
    receive in the content surface, a selection of a callout from the content surface, wherein the callout provides items that are not displayed in the content surface prior to a first callout selection;
    display the callout at an initial position in response to the selection, the initial position comprising the callout floating above the content surface in the user interface, a portion of the callout comprising a selectable icon;
    receive in the user interface, a first request to pin the callout to a final position on the content surface, the first request comprising an input on the selectable icon;
    in response to receiving the input on the selectable icon, display in the user interface, an animation of the callout moving, from the initial position, across the content surface until the final position has been reached; and pin in the user interface, the callout to the content surface at the final position to integrate the callout with the content displayed in the content surface by dropping the callout down to the same level as the content surface so the callout no longer floats above the content surface.

10. The system of claim 9, wherein the processor, in pinning the callout to the content surface at the final position is operative to display a cross-fade animation showing a transition of the callout from a position above the content surface at the final position to a docked state within the content surface at the final position.

11. The system of claim 10, wherein the processor is further to:

receive in the user interface, a second request to pin at least one additional callout to the final position on the content surface;

display in the user interface, an animation of the at least one additional callout moving across the content surface until the final position has been reached;

pin in the user interface, the at least one additional callout to the content surface at the final position and resize a docked callout to make space for the at least one additional callout at the final position.

12. The system of claim 11, wherein the callout and the at least one additional callout comprise items of content selected from a group comprising at least a tasks list, a contacts list and a calendar.

13. The system of claim 10, wherein pin in the user interface, the callout to the content surface at the final position to integrate the callout with the content displayed in the content surface further by removing a border that surrounds the callout.

14. A computer-implemented method for animating an attachment of content items to a location on a content surface in a user interface of an application, comprising:

displaying content on the content surface in a first user interface window of the application, wherein the content surface does not include any item that is configured to float above or cover the content;

receiving a first content item selection in the application;

in response to the first content item selection, displaying a first content item including text in a piece of user interface that is separate from and floats above the content surface in the first user interface window, wherein the first content item provides objects that are not displayed in the content surface prior to the first content item selection;

receiving a first pin selection of the first content item in the application;

in response to the first pin selection, pinning the first content item to the content surface of the application, wherein pinning the first content item comprises:

animating movement of the piece of user interface across the content surface from a first location above the content surface to a first pin location within the content surface;

removing the piece of user interface that floats above the content surface to integrate at least half of the text in the first content item into the content surface; and displaying a pinned first content item on the content surface.

15. The method of claim 14, wherein pinning the first content item further comprises:

animating a size adjustment of the content on the content surface in as the piece of user interface moves across and above the content surface of the first user interface window to adjust for a size of the first content item as pinned in the content surface to form a size adjusted content.

16. The method of claim 15, wherein animating the size adjustment further comprises resizing the text in the content item as the content item moves across the content surface towards the first pin location.

17. The method of claim 14, wherein pinning the first content item further comprises:

displaying a cross-fade animation showing a transition of the content item floating above the first pin location on the content surface to a docked state within the content surface at the first pin location.

18. The method of claim 14, further comprising:

receiving a request to attach another content item to the first pin location on the content surface;

in response to receiving the request to attach the another content item, displaying in the user interface an animation of the another content item moving across the content surface until the first pin location has been reached; and attaching in the user interface the another content to the content surface at the first pin location.

19. The method of claim 18, wherein attaching in the user interface the another content item to the content surface at the first pin location comprises:

resizing a docked content item to make space for the another content item at the first pin location.

20. The method of claim 18, wherein pinning the first content item further comprises:

removing a border that surrounds the content item.

* * * * *